(12) United States Patent
Mendoza et al.

(10) Patent No.: US 9,437,867 B2
(45) Date of Patent: Sep. 6, 2016

(54) BATTERY PLATE GRID STRIP PASTING ASSEMBLY

(71) Applicant: Wirtz Manufacturing Company, Inc., Port Huron, MI (US)

(72) Inventors: Roel Mendoza, Fort Gratiot, MI (US); John O. Wirtz, Fort Gratiot, MI (US)

(73) Assignee: Wirtz Manufacturing Company, Inc., Port Huron, MI (US)

( * ) Notice: Subject to any disclaimer, the term of this patent is extended or adjusted under 35 U.S.C. 154(b) by 129 days.

(21) Appl. No.: 14/507,129

(22) Filed: Oct. 6, 2014

(65) Prior Publication Data

US 2015/0096645 A1 Apr. 9, 2015

Related U.S. Application Data

(60) Provisional application No. 61/886,763, filed on Oct. 4, 2013.

(51) Int. Cl.
*H01M 4/20* (2006.01)

(52) U.S. Cl.
CPC .............. *H01M 4/20* (2013.01); *Y02E 60/126* (2013.01)

(58) Field of Classification Search
CPC ... H01M 4/20; H01M 4/0407; H01M 4/0409
USPC .................................................... 141/1.1, 32
See application file for complete search history.

(56) References Cited

U.S. PATENT DOCUMENTS

| 4,050,482 | A | * | 9/1977 | Ching | H01M 4/20 118/405 |
| 4,606,383 | A | * | 8/1986 | Yanik | H01M 4/20 141/1.1 |
| 4,932,443 | A | * | 6/1990 | Karolek | H01M 4/20 141/1.1 |
| 5,467,805 | A | * | 11/1995 | Farina | H01M 4/20 141/1.1 |
| 8,272,408 | B2 | * | 9/2012 | Fredrickson | H01M 4/20 141/1.1 |
| 2009/0255604 | A1 | * | 10/2009 | Fredrickson | H01M 4/20 141/1.1 |
| 2015/0096645 | A1 | * | 4/2015 | Mendoza | H01M 4/20 141/1.1 |

* cited by examiner

*Primary Examiner* — Timothy L Maust
(74) *Attorney, Agent, or Firm* — Reising Ethington, P.C.

(57) ABSTRACT

A battery plate grid strip pasting assembly can include an orifice plate, a support structure, and a belt. The orifice plate has an opening through which battery paste material is dispensed out of a hopper. The support structure underlies a battery plate grid strip and supports the battery plate grid strip upstream of the opening. The belt traverses beneath the orifice plate and carries the battery plate grid strip downstream of the opening and downstream of the support structure. The support structure supports the battery plate grid strip above the belt and a gap is provided between a bottom surface of the battery plate grid strip and a top surface of the belt. Battery paste material is dispensed into the gap, through the battery plate grid strip, and overpastes the bottom surface of the battery plate grid strip.

21 Claims, 4 Drawing Sheets

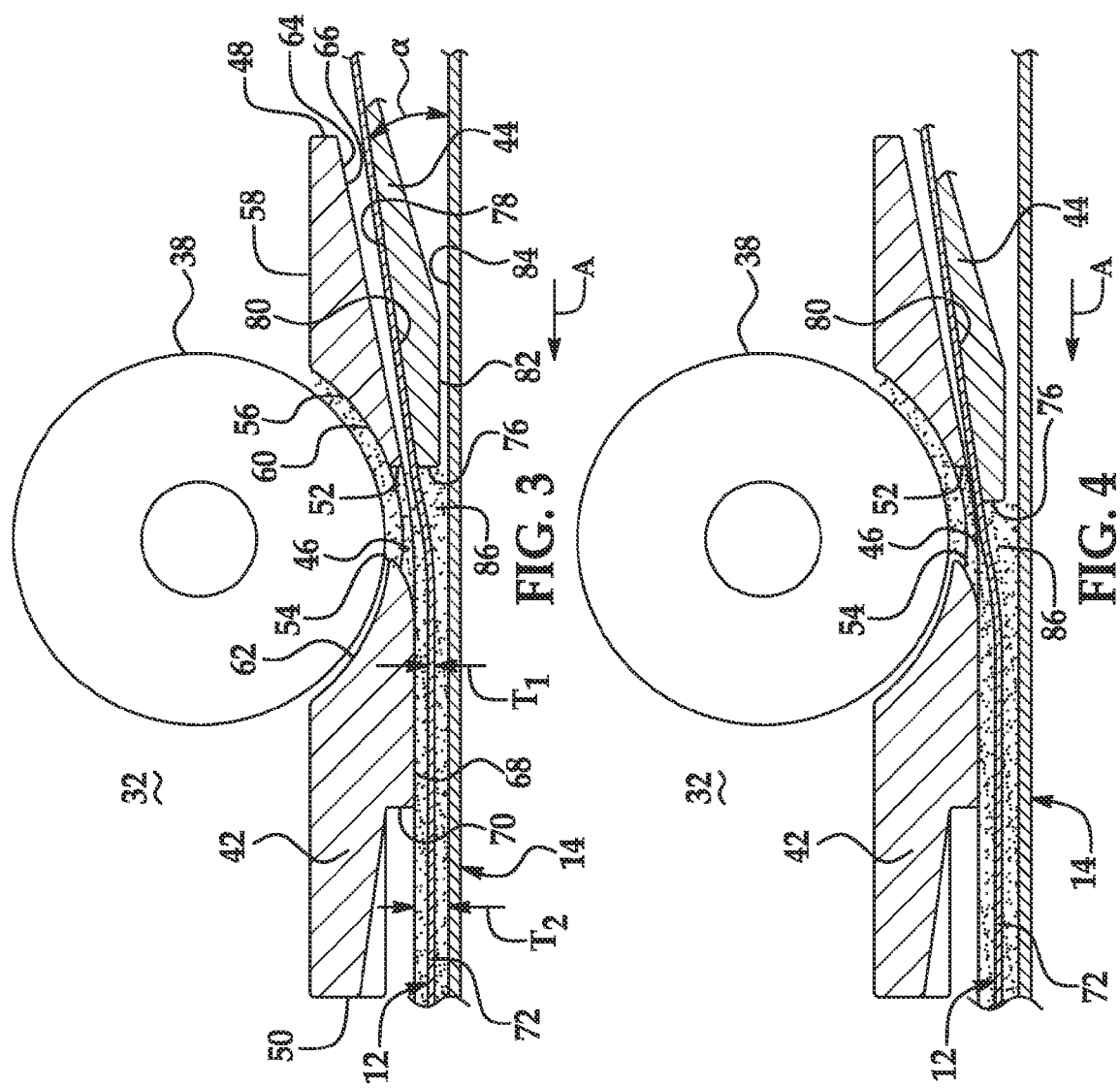

BATTERY PLATE GRID STRIP PASTING ASSEMBLY

REFERENCE TO CO-PENDING APPLICATION

This application claims priority to U.S. Provisional Application No. 61/886,763 filed Oct. 4, 2013, which is incorporated herein by reference in its entirety.

TECHNICAL FIELD

This disclosure relates generally to lead-acid battery manufacturing equipment, and more particularly to battery plate grid pasting machines.

BACKGROUND

Lead-acid batteries are a common source of electrical energy and are often used as automotive batteries, marine batteries, consumer equipment batteries, industrial batteries, and in other applications. Among other components, lead-acid batteries include numerous plates that are assembled in a case and that are made of lead alloy metal grids with an electrochemically active battery paste material applied on the grids. The grids are usually supplied in a continuous strip of individual grids connected together. The strip is fed through a pasting machine where the battery paste material is applied to the grids. The battery paste material, however, is not always applied sufficiently over both sides of the strip of grids, and oftentimes a bottom surface of the strip has no paste below or outboard of a plane of the bottom surface and can even have portions without paste. This insufficient battery paste material, and in some cases absence of it, can degrade battery performance, shorten the battery's useful life, and cause other troubles.

SUMMARY

One embodiment of a battery grid strip pasting assembly may include an orifice plate, a support structure, and a belt. The orifice plate has an opening through which battery paste material is dispensed out of a hopper during use of the battery plate grid strip pasting assembly. The support structure underlies a battery plate grid strip and supports the battery plate grid strip upstream of the opening of the orifice plate. The belt traverses beneath the orifice plate and carries the battery plate grid strip downstream of the opening of the orifice plate and downstream the support structure. The support structure supports the battery plate grid strip above the belt and a gap is provided between a bottom surface of the battery plate grid strip and a top surface of the belt. The gap is located beneath the opening of the orifice plate and has a dimension taken between the bottom and top surfaces that is approximately equal to or greater than a thickness dimension of the battery plate grid strip. Battery paste material is dispensed into the gap and overpastes the bottom surface of the battery plate grid strip during use of the battery plate grid strip pasting assembly.

One embodiment of a method of dispensing battery paste material for overpasting a bottom surface of a battery plate grip strip includes at least two steps. A first step involves leading the battery plate grid strip over a declining slope toward an opening that dispenses battery paste material. The declining slope is defined by a top surface of a support structure. The support structure supports the battery plate grid strip above a belt. The bottom surface of the battery plate grid strip is spaced above a top surface of the belt at the opening. A second step involves dispensing battery paste material out of the opening to the battery plate grid strip. The battery paste material is dispensed through the battery plate grid strip and in-between the bottom surface of the battery plate grid strip and the top surface of the belt at a location where the battery plate grid strip is supported above the belt underneath the opening.

Another embodiment of a battery grid strip pasting assembly may include an orifice plate, a support structure, and a belt. The orifice plate has an opening through which battery paste material is dispensed during use of the battery plate grid strip pasting assembly. The support structure is located partly or more underneath the orifice plate and supports a battery plate grid strip upstream of the orifice plate's opening. The support structure has a top surface that comes into contact with the battery plate grid strip when the support structure is supporting the battery plate grid strip. The belt is located partly or more underneath the orifice plate. The top surface of the support structure presents a slope that declines toward the belt and relative to the belt. The top surface and its declining slope lead the battery plate grid strip to the belt and underneath the orifice plate's opening. A gap is provided between a bottom surface of the battery plate grid strip and a top surface of the belt at a free edge of the support structure. Battery paste material is dispensed into the gap during use of the battery plate grid strip pasting assembly.

BRIEF DESCRIPTION OF THE DRAWINGS

Objects, features, and advantages of the present disclosure will be apparent from the following detailed description of exemplary embodiments and best mode, appended claims, and accompanying drawings in which:

FIG. 3 is an enlarged view showing an embodiment of an orifice plate, a support structure, and a belt of the battery plate grid pasting machine;

FIG. 4 is an enlarged view showing another embodiment similar to the assembly of FIG. 3;

DETAILED DESCRIPTION

Figure 1:
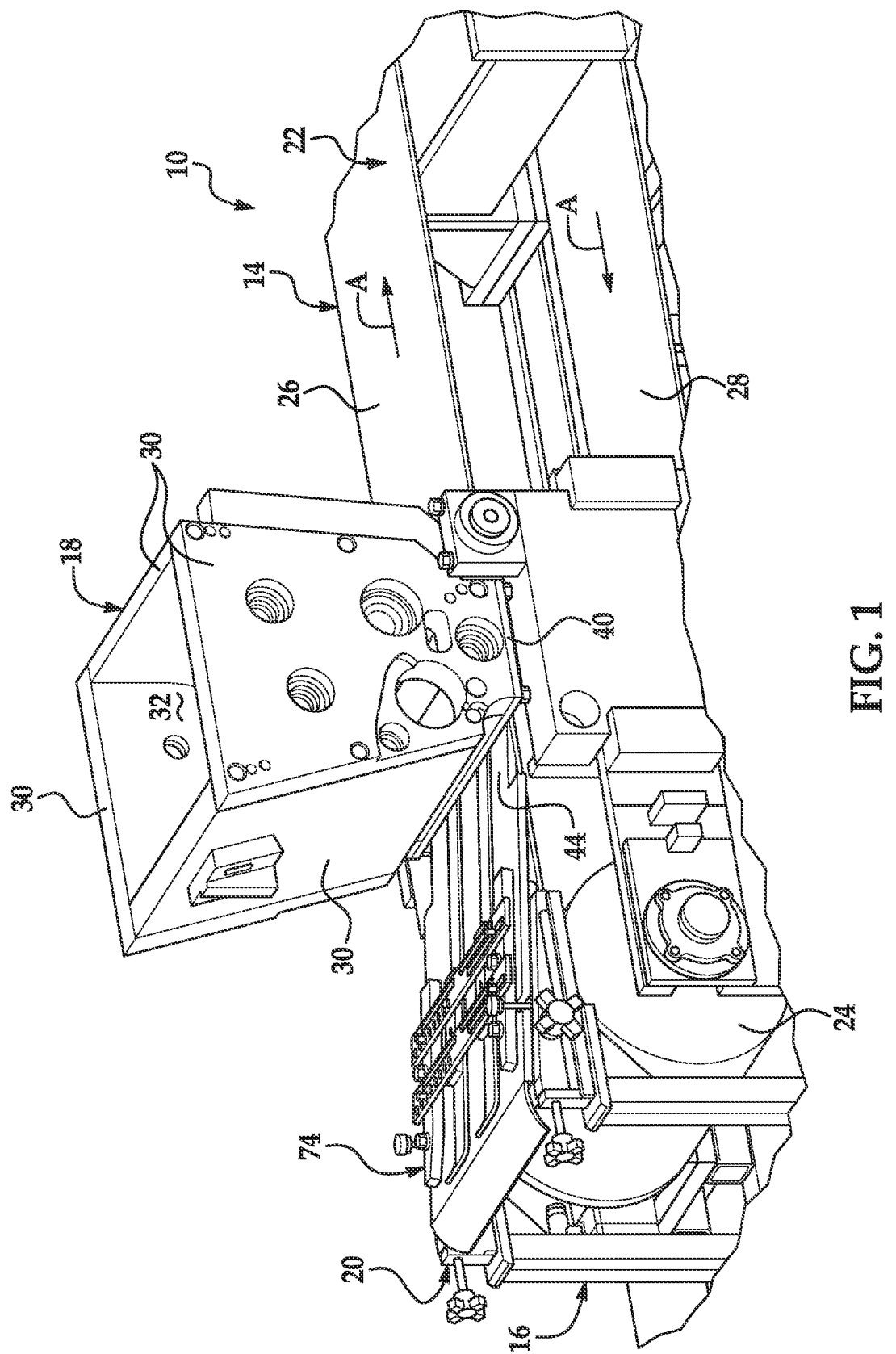
FIG. 1 is a partial perspective view of an example of a battery plate grid pasting machine.

Referring in more detail to the drawings, FIG. 1 partially shows a battery plate grid strip pasting machine 10 that is designed and constructed to more sufficiently and evenly apply electrochemically active battery paste material in and overpasting top and bottom surfaces of a battery plate grid strip 12 (FIG. 2) fed through the machine. The grid strip 12 is kept off of and spaced vertically above an underlying belt 14 at a location where battery paste material is dispensed from the pasting machine 10, and therefore paste can be delivered between the bottom surface of the grid strip and the belt and can more readily adhere to the bottom surface of the grid strip. The battery plate grid strip pasting machine 10 can be used in processes that produce batteries for cars, trucks, hybrid vehicles, motorcycles, boats, snowmobiles, golf carts, consumer equipment such as powered wheelchairs, industrial equipment such as forklifts and robots, and for other applications. As an aside, and as used herein, the term "longitudinal" and its related forms generally refers to a forward and rearward direction in which a battery grid strip is conveyed through the pasting machine 10 and on the belt 14, and the term "lateral" and its related forms generally refers to a direction that is generally transverse or substantially orthogonal to the longitudinal direction. Further, as used herein, the terms "upstream" and "downstream" refer to directions with respect to the direction of travel of the grip strip 12 through the pasting machine 10.

Figure 5:
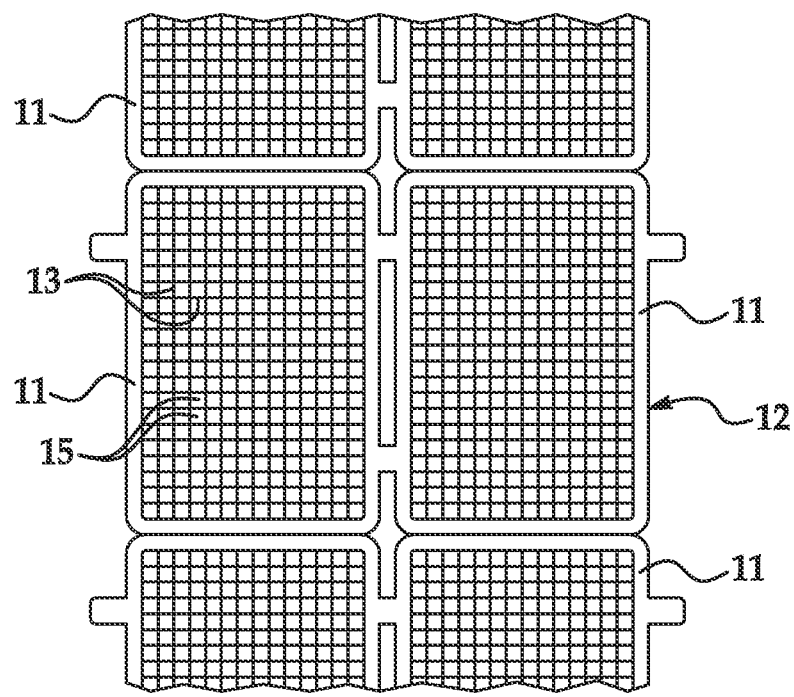
FIG. 5 is a top view of a portion of a battery plate grid strip.

In general, the battery plate grid strip pasting machine 10 receives the grid strip 12 and applies and coats battery paste material onto and over outer faces of the grids in the strip. The step of applying battery paste material is but one step in a larger process of manufacturing and assembling lead-acid batteries. The grid strip 12 is received at the pasting machine 10 without battery paste material and as an unbroken continuous strip of metal with individual grids connected together. FIG. 5 shows the grid strip 12 without battery paste material and with laterally side-by-side and longitudinally connected individual grids. After pasting, the pasted grid strip 12 is ordinarily led to a severing process in which the strip is cut into its individual grids and to a flash drying process to remove moisture from the applied battery paste material. The individual grids of the strip are typically composed of a lead or lead alloy material, and are conventionally designed with a peripheral frame 11 and crisscrossing sets of horizontal and vertical wires 13 interconnected at nodes with open spaces 15 between the wires to receive battery paste material. Further, the grid strip 12 can have a single line of longitudinally connected individual grids and without laterally connected grids.

The battery plate grid strip pasting machine 10 can have different designs, constructions, and components, depending upon—among other considerations—the size of the grid strip being pasted, the desired output rate of pasting, and preceding and subsequent steps in the larger manufacturing and assembling process. In the example illustrated in FIG. 1, the pasting machine 10 generally includes a frame 16, the belt 14, and a hopper 18. The frame 16 provides a structural skeleton for the pasting machine 10 and physically supports other components of the machine. The frame 16 usually is made up of several vertical, side, and cross members of steel joined together. The belt 14 is used to carry the grid strip 12 generally longitudinally through the pasting machine 10 from an entry end 20 to an exit end 22 and underneath the hopper 18. Different types of belts can be used including a single wide endless or circumferentially continuous belt as shown, and they can be composed of different materials such as stainless steel, plastic, or rubber. A motor (not shown) can drive movement of the belt 14 via one or more rollers 24 that are also used to keep the belt taut. Though not illustrated, another roller can be provided longitudinally opposite and spaced from the one shown in FIG. 1, and one or more intermediate rollers and/or underlying plates can support the belt 14 near and beneath the hopper 18. Arrows A in FIG. 1 represent the directions of movement of the belt 14 along an upper run 26 and a lower run 28 thereof during a pasting operation; the same arrow A is provided in FIGS. 2-4 as well.

The hopper 18 is supported by the frame 16 vertically above the belt 14, contains and holds battery paste material, and dispenses the paste onto the grid strip 12 carried on the belt beneath the hopper. Referring now to both FIGS. 1 and 2, the hopper 18 is preferably constructed of four walls 30 that define an interior 32 to receive battery paste material. To keep the paste in a mixed and somewhat agitated state and more readily dispensed, several internal feed rollers 34 and paddles 36 are rotatably mounted to the walls 30 and in the interior 32 submerged in paste. A paste delivery roller 38, in particular, can be positioned at and can rotate closest to a paste dispensing end 40 of the hopper 18. The paste is fed through the hopper 18 and in-between the rollers 34, 38 toward the dispensing end 40, as depicted by arrows B in FIG. 2. Gear and axle assemblies are interconnected to the rollers 34, 38 and paddles 36 and, via a hopper motor (not shown), rotate the rollers and paddles during use of the pasting machine 10. In other embodiments, the hopper 18 and its rollers and paddles can have different designs and constructions than that shown and described herein.

And though not shown in the figures, paper rollers can be provided in order to apply paper layers on top of and below the battery paste material dispensed onto the grid strip 12. A below paper layer can merge with the belt 14 beneath the grid strip 12 before the hopper 18 dispenses battery paste material onto the grid strip. A top paper layer can merge on top of the grid strip 12 having dispensed battery paste material after the hopper 18 dispenses the material. The paper layers prevent the battery paste material from being adhered to components like the belt 14 and are commonly referred to as pasting papers.

Figure 2:
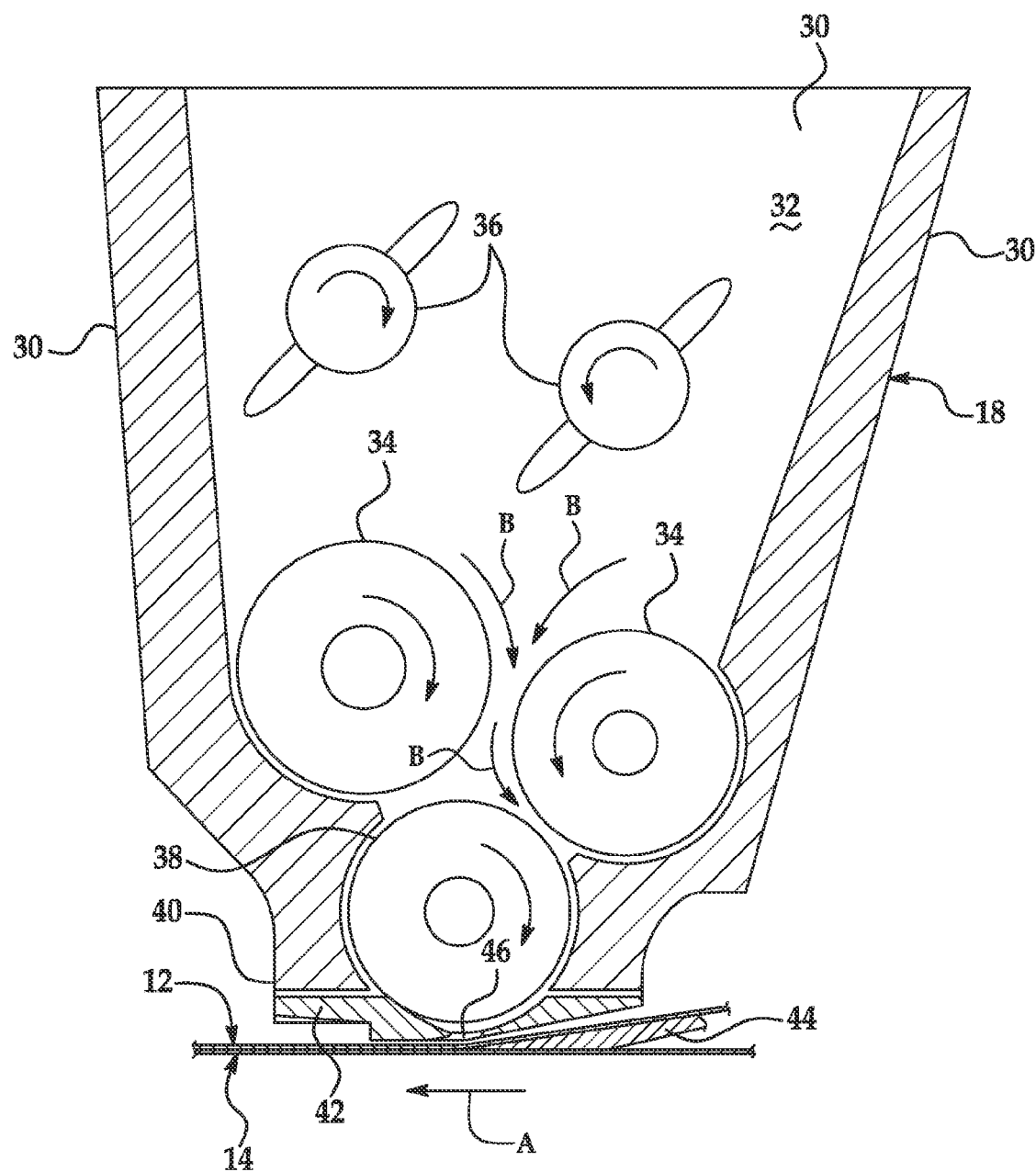
FIG. 2 is a sectional view of a hopper and other components of the battery plate grid pasting machine of FIG. 1.

Referring now to FIGS. 2 and 3, at the dispensing end 40 the hopper 18 has an assembly of components that are designed and constructed to more sufficiently and evenly apply battery paste material on, and overpasting, both faces and surfaces of the grid strip 12 compared to previously-known paste application techniques and machines. The assembly can have different designs, constructions, and components, depending upon—among other considerations—the size and stiffness of the grid strip being pasted, the desired output rate of pasting, and the desired amount of battery paste material to be applied on and overpasting each face and surface of the grid strip. In this embodiment, the assembly includes an orifice plate 42 and a grid support structure 44. The orifice plate 42 is mounted to a bottom end of the hopper 18 and, with the exception of an orifice slot or opening 46, generally closes the bottom end. Referring particularly to FIG. 3, when observed from a top or bottom plan view, the orifice plate 42 has a generally rectangular shape with a front or leading edge 48 and a rear or trailing edge 50. The opening 46 communicates with the interior 32 of the hopper 18 as battery paste material held in the interior is fed through the opening to the underlying and passing grid strip 12. Though shown in side sectional view in FIGS. 2 and 3, the opening 46 has a generally rectangular shape when observed from a top or bottom plan view, and is defined in part by a leading edge 52 and a trailing edge 54 of the rectangle; other shapes are possible for the opening including a square shape. In one specific example, the opening 46 has a longitudinal dimension taken between the leading and trailing edges 52, 54 of approximately 0.711 inches; of course, other longitudinal dimensions are possible in other examples. The opening 46 is defined through the body of the orifice plate 42 and is bounded on all sides by edges of the orifice plate including the leading and trailing edges 52, 54. The lateral extent of its rectangular shape extends at least substantially across the lateral extent of the grid strip 12 and preferably is less than the lateral extent of the orifice plate 42 itself.

To more readily feed battery paste material through the opening 46, a depression 56 is located on a top surface 58 of the orifice plate 42 that confronts the interior 32. The depression 56 is defined by a pair of arcuately-shaped surfaces 60, 62 and is complementarily-shaped to the paste delivery roller 38 so that the roller can nest in the depression with a slight clearance maintained therebetween. The opening 46 interrupts the otherwise continuous arcuate shape of the surfaces 60, 62 near the lowest point of the arc. Opposite the depression 56 on a bottom surface 64 of the orifice plate 42, a gradually declining surface 66 with respect to the direction of grid strip travel on the belt 14 spans between the leading edge 48 and the leading edge 52 and is positioned upstream of a longitudinal side of the opening 46. Downstream of the opening 46, a surface 68 spans between the trailing edge 54 and the trailing edge 50 and preferably has a vertical step 70 therebetween. The surface 68 is essentially parallel to the underlying surface of the upper run 26 of the belt 14. The surfaces 66, 68 directly confront a top surface 72 of the grid strip 12 across a space between them. In other embodiments the orifice plate 42 can have different designs and constructions than shown and described below.

The support structure 44 is part of a larger grid entrance guide assembly 74 (FIG. 1) supported by the frame 14 that is used to aid and pilot the entry of the grid strip 12 as it approaches the hopper 18. In this embodiment the support structure 44 is in the form of a support plate that in a sense serves as a slide for the grid strip 12. But in other embodiments the support structure 44 could take other forms including multiple plank-like or finger-like structures connected to one another and arranged in the longitudinal direction. Still referring to FIG. 3, the portion of the support structure 44 shown is located underneath the orifice plate 42 and is held vertically above the belt 14. When observed from a top or bottom plan view, the support structure 44 has a generally rectangular shape with a free edge 76 forming a side of the rectangle. A top surface 78 directly confronts and makes direct contact with a bottom surface 80 of the passing grid strip 12, and gradually declines with respect to the direction of grid strip travel on the belt 14 similar and somewhat complementary to the surface 66 of the orifice plate 42. As perhaps illustrated best in FIGS. 3 and 4, the top surface 78 presents a slope that gradually declines with respect to the belt 14 and with respect to the direction of grid strip travel on the belt. The pasting grid strip 12 is led over the slope and to the opening 46. A bottom surface 82 directly confronts a top surface 84 of the belt 14.

The assembly of the orifice plate 42 and support structure 44 can help ensure that sufficient battery paste material is delivered and adhered to the bottom surface 80 of the grid strip 12 and overpastes the bottom surface, which has been especially troublesome with the previously-known techniques and pasting machines. When battery paste material is adhered more thinly on one side than desired (such as a bottom surface), a grid's structure like its wires can more easily corrode during use in the accompanying battery. And in some cases when no battery paste material is adhered on one side, the grid's wires can be exposed to acid in the battery and the wires can disintegrate. Moreover, with no battery paste material on one side, the other side of paste may not produce an adequate mechanical bond and may in turn altogether fall off of the grid. In any of these cases, the battery's overall performance can deteriorate and its useful life can shorten.

Without wishing to be confined to a particular theory of causation, it has been found and is currently believed that in the previously-known techniques and pasting machines, battery paste material does not always make its way to the bottom surface of the grid strip due to surface-to-surface confrontation that is too close or that even makes abutment between the bottom surface of the grid strip and the top surface of the belt. This may consequently leave little or no space for battery paste material to gather between the grid strip and belt, and precludes adherence of paste to the bottom surface of the grid strip and precludes overpasting of the bottom surface. Adding to the difficulty, pressure and forces exerted against the top surface of the grid strip by the dispensing of battery paste material tends to urge the grid strip toward and onto the belt and thereby diminishes and essentially eliminates any space between them.

Figure 6:
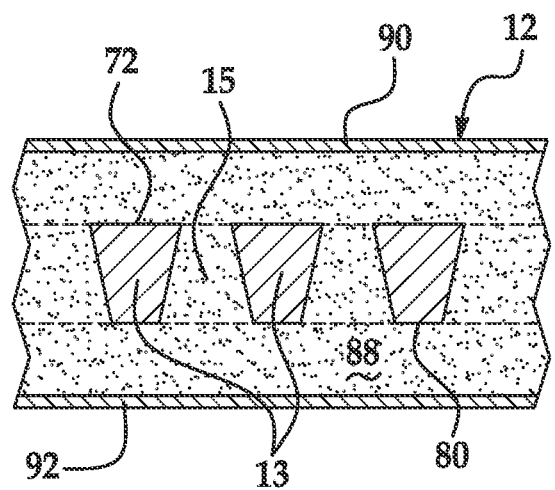
FIG. 6 is a longitudinal sectional view of a portion of the battery plate grid strip of FIG. 5 with battery paste material applied thereto and overpasted with paste material outboard of both faces of top and bottom surfaces of the grid strip.

To counter these troubles and difficulties, the assembly described herein maintains a gap 86 between the bottom surface 80 of the grid strip 12 and the top surface 84 of the belt 14 where dispensed battery paste material can gather and ultimately adhere to the bottom surface of the grid strip and overpaste the bottom surface. Dispensed battery paste material gathers in and substantially fills the gap 86 after it passes through the open spaces between the criss-crossing wires of the strip's individual grids, and is picked-up and carried by the bottom surface 80 as the grid strip 12 continues its downstream travel. The dispensed battery paste material is represented in FIGS. 3, 4, and 6 by the many specks illustrated in the figures. Still referring to FIG. 3, the gap 86 is defined in part vertically between the bottom surface 80 and the top surface 84. In this embodiment, the greatest vertical height of the gap 86 is at the leading edge 52 of the opening 46 and at the free edge 76 of the support structure 44—here, the leading and free edges are vertically aligned with each other, and the greatest vertical height of the gap 86 is where the grid strip 12 initially comes off of the top surface 78 of the support structure.

The vertical height of the gap 86 is measured between the bottom surface 80 of the grid strip 12 and the top surface 84 of the belt 14. The exact vertical height of the gap 86 can vary and can be based upon the desired amount of battery paste material to be adhered to and overpasted on the bottom surface 80 of the grid strip 12. For example, to get a sufficient and more even amount or thickness of battery paste material outboard of the top and bottom surfaces 72, 80 of the grid strip 12—that is, an approximately fifty/fifty top to bottom proportion or equal thickness of the paste material—the gap 86 can have a vertical height $H_1$ at the leading edge 52 of the opening 46. On the other hand, to get a slightly uneven amount of an approximately sixty/forty top to bottom proportion, the gap 86 can have a vertical height $H_2$ at the leading edge 52 which is less than the vertical height $H_1$. Both of these paste material proportions are a significant improvement in overpasting compared to that obtained in the previously-known techniques and machines that have been estimated to yield no more than an approximately ninety/ten top to bottom proportion and usually with essentially no overpasting of the bottom surface at all. The fifty/fifty and sixty/forty proportions, as well as others, have been found to significantly decrease and in some cases altogether eliminate the corrosion and other troubles resulting from an undesirably thin layer of paste adhered on the bottom surface. In another example, the gap 86 can have a vertical height dimension taken at the free edge 76 of the support structure 44 that is approximately equal to or greater than a thickness dimension $T_1$ of the grid strip 12, or that ranges between approximately fifteen percent (15%) and one-hundred-and-fifty percent (150%) of the thickness dimension $T_1$. In one specific example, the thickness dimension $T_1$ is approximately 0.05 inches; of course, other thickness dimensions are possible in other examples. In yet another example, the gap 86 can have a vertical height dimension taken at the free edge 76 that ranges between approximately one-hundred percent (100%) and one-hundred-and-fifty percent (150%) of a final product thickness dimension $T_2$. In one specific example, the thickness dimension $T_2$ is approximately 0.1 inches; of course, other thickness dimensions are possible in other examples. The final product thickness dimension $T_2$ includes the thickness of the paste material on both sides of the grid strip 12, as well as the thickness $T_1$ (0.05 inches) of the grid strip itself. The exact percentage in this example can depend on paste density. These relationships have been found to ensure sufficient battery paste material overpasting on, and adhering to, the bottom surface 80 in order to substantially limit and in some cases altogether eliminate the corrosion and other troubles resulting from undesirably thin layers of paste adhered on the bottom surface.

In general, the gap 86 is located at a longitudinal position that is in line with the opening 46 and between the opening's leading and trailing edges 52, 54 so that battery paste material dispensed through the opening can make its way into and fill the gap. And though the gap 86 tapers in vertical height in the longitudinal downstream direction of grid strip travel, the gap has a longitudinal extent that is sufficient to help ensure an adequate thickness of the overpasted battery paste material outboard of and adhered to the bottom surface 80 of the grid strip 12. In the embodiment of FIG. 3, the longitudinal extent of the gap 86 can be less than or equal to the longitudinal extent of the opening 46 so that by the time the grid strip 12 travels past the opening, battery paste material adhered to the bottom surface 80 has already made contact with the top surface 84 of the belt 14 or with a pasting paper on the belt.

The gap 86 and its capacity to receive battery paste material can be established in different ways, depending in part upon the assembly of components provided in a particular battery plate grid strip pasting machine. In the embodiment of FIG. 3, for instance, an acute angle $\alpha$ of the top surface 78 relative to the belt 14 and the longitudinal position of the free edge 76 relative to the leading edge 52 contribute to the formation of the gap 86 and help ensure that battery paste material is received in the gap. Because the grid strip 12 rides on and over the top surface 78, the angle $\alpha$ is also the approximate angle at which the strip approaches the belt 14. If the angle $\alpha$ is too small (i.e., closer to zero degrees) the gap 86 may in turn be too small to receive battery paste material; and similarly, if the angle $\alpha$ is too large (i.e., closer to ninety degrees) the gap may again be too small to receive battery paste material. It has been found that an angle $\alpha$ of between approximately five degrees (5°) and fifteen degrees (15°), and preferably between approximately ten degrees (10°) and twelve degrees (12°), provides a gap 86 that receives a sufficient amount of battery paste material for overpasting of and adherence to the bottom surface 80 in order to significantly decrease, and in some cases altogether eliminate, the corrosion and other troubles resulting from an undesirably thin layer of paste over the bottom surface. The angle $\alpha$ lying between approximately five and fifteen degrees has also been found to help ensure that the grid strip 12 is not bent, buckled, or otherwise forced into the gap 86 by the force and pressure of battery paste material being dispensed from the opening 46. Other values for the angle $\alpha$ may also exist that provide a similarly sufficient amount of battery paste material.

Furthermore, in FIG. 3 the longitudinal positions of the free edge 76 and the leading edge 52 are in alignment with each other. Compared to a specific previously-known construction, the opening 46 and hence its leading and trailing edges 52, 54 have been displaced and moved upstream (i.e., in the opposite direction of arrow A in FIG. 3) by approximately 0.30 inches from its previous location (of course, in other examples other displacement distances are possible). This displacement moved both the leading edge 52 and the trailing edge 54 upstream 0.30 inches relative to a centerline or center axis of the paste delivery roller 38, and without necessarily modifying the longitudinal dimension (0.711 inches) of the opening 46. In this way, the gap's longitudinal extent is substantially entirely overlapped by that of the opening 46 which helps ensure that sufficient battery paste material exiting the opening will indeed make its way into and fill the gap. The longitudinal positions, however, need not be aligned and can vary in other embodiments. For example, in the modification of FIG. 4, the free edge 76 is moved and positioned in the downstream direction toward the trailing edge 54 so that the free edge and the leading edge 52 are unaligned with each other. Here, the free edge 76 is positioned approximately slightly less than midway between the leading and trailing edges 52, 54 while still providing a gap 86 that receives a sufficient amount of battery paste material for overpasting the bottom surface 80 in order to significantly decrease, and in some cases altogether eliminate, the corrosion and other troubles resulting from little or no paste material on the bottom surface. In the embodiments of FIGS. 3 and 4, the position of the free edge 76 relative to the leading edge 52 helps ensure that the grid strip 12 is not bent, buckled, or otherwise forced into the gap 86 by the force and pressure of battery paste material being dispensed from the opening 46. In yet other embodiments not shown in the figures, the free edge 76 could be moved and positioned in the upstream direction so that the free edge is located underneath the orifice plate 42 and misaligned with the opening 46. Here, the free edge 76 and leading edge 52 would be unaligned. This embodiment could be suitable with grid strips composed of a material stiff enough so that the strip is not bent, buckled, or otherwise forced into the gap 86 by the force and pressure of battery paste material being dispensed from the opening 46 and the gap is therefore maintained for a longitudinal extent that partially overlaps the opening 46 and receives sufficient paste exiting the opening. In contrast, in the specific previously-known construction its free edge (76) was 0.75 inches to 1.0 inches upstream of its leading edge (52) of its opening (46).

FIG. 6 depicts a partial sectional view of the battery plate grid strip 12 pasted via an assembly like that described above in which the gap 86 is maintained between the grid strip and the belt 14. Battery paste material 88 is received in the open spaces 15 between the wires 13 and is overpasted on the top and bottom surfaces 72, 80 to an approximately fifty/fifty top to bottom proportion of paste material. Top and bottom paper layers 90, 92 are depicted as laying over the battery paste material 88.

While the forms of the invention herein disclosed constitute exemplary forms and embodiments, many others are possible. It is not intended herein to mention all the possible equivalent forms or ramifications of the invention. The terms used herein are merely descriptive, rather than limiting, and various changes may be made without departing from the spirit or scope of the invention.

The invention claimed is:

1. A battery plate grid strip pasting assembly, the assembly comprising:

a hopper having adjacent its bottom an orifice with a leading edge and a trailing edge and through which battery paste material is dispensed out of the hopper during use of the battery plate grid strip pasting assembly, a paste delivery roller having an axis of rotation and overlying and in proximity to the orifice for delivering battery paste material out of the hopper;

a support structure having a leading edge and a trailing free edge and underlying a battery plate grid strip and supporting the battery plate grid strip at least upstream of said orifice;

a belt having a run traversing beneath said orifice and carrying the battery plate grid strip downstream of said orifice and downstream of said support structure;

the support structure having a surface underlying and supporting the battery grid strip at least upstream of the orifice and inclined to the run of the belt beneath the orifice at an acute included angle of between approximately 5° and 15°, and the support structure is disposed longitudinally between proximate to the leading edge of the orifice and midway between the leading and trailing edges of the orifice, said support structure supports the battery plate grid strip above said belt to provide a gap between a bottom surface of the battery plate grid strip and a top surface of said belt, said gap is located beneath said orifice and has a dimension taken between said bottom and top surfaces proximate said trailing free edge that is approximately equal to or greater than a thickness dimension of the battery plate grid strip, and battery paste material is dispensed through the battery plate grid strip and into said gap and overpastes the bottom surface of the battery plate grid strip during use of the battery plate grid strip pasting assembly.

2. The battery plate grid strip pasting assembly of claim 1, wherein said trailing free edge is located approximately at said leading edge.

3. The battery plate grid strip pasting assembly of claim 1, wherein said leading edge and said trailing free edge are unaligned with each other.

4. The battery plate grid strip pasting assembly of claim 3, wherein said trailing free edge is located downstream of said leading edge toward said trailing edge of said orifice.

5. The battery plate grid strip pasting assembly of claim 1, wherein said acute included angle is between approximately ten degrees (10°) and twelve degrees (12°).

6. The battery plate grid strip pasting assembly of claim 1, wherein said acute included angle is between approximately ten degrees) (10°) and fifteen degrees (15°).

7. The battery plate grid strip pasting assembly of claim 1, wherein said support structure has a top surface directly contacting the battery plate grid strip, said top surface presenting a declining slope with respect to said belt, said declining slope of said top surface leading the battery plate grid strip beneath said orifice.

8. The battery plate grid strip pasting assembly of claim 1, wherein said gap is located at said leading edge of said orifice and tapers toward a trailing edge of said orifice.

9. The battery plate grid strip pasting assembly of claim 1, wherein said gap has its greatest height dimension taken between said bottom surface of the battery plate grid strip and said top surface of said belt at the trailing free edge of said support structure.

10. The battery plate grid strip pasting assembly of claim 1, wherein said support structure is a support plate.

11. The battery plate grid strip pasting assembly of claim 1, wherein a height dimension of said gap taken between said bottom and top surfaces ranges between approximately one-hundred percent (100%) and one-hundred-and-fifty percent (150%) of a thickness dimension of the battery plate grid strip plus a thickness dimension of the overpasted battery paste material on top and bottom surfaces of the battery plate grid strip.

12. The battery plate grid strip pasting assembly of claim 1, further comprising an orifice plate having said orifice and mounted on said hopper.

13. The battery plate grid strip pasting assembly of claim 1, wherein a height dimension of said gap taken between said bottom and top surfaces is greater than a thickness dimension of the overpasted battery paste material on the bottom surface of the battery plate grid strip.

14. A method of dispensing battery paste material for overpasting a bottom surface of a battery plate grip strip, the method comprising:

leading the battery plate grid strip over a declining slope toward an opening that dispenses battery paste material, said declining slope defined by a top surface of a support structure, the support structure supporting the battery plate grid strip above a belt, the top surface inclined at an acute included angle of approximately ten degrees (10°) to fifteen degrees (15°) to a portion of a top surface of the belt underlying the opening, the support structure having a trailing free edge disposed between proximate a leading edge of the opening and halfway between the leading edge and a trailing edge of the opening, wherein the bottom surface of the battery plate grid strip is spaced above a top surface of the belt at the opening that dispenses battery paste material; and dispensing battery paste material out of the opening to the battery plate grid strip, wherein battery paste material is dispensed through the battery plate grid strip and in-between the bottom surface of the battery plate grid strip and the top surface of the belt at a location where the battery plate grid strip is supported above the belt underneath the opening.

15. A battery plate grid strip pasting assembly, the assembly comprising:

an orifice plate having an opening through which battery paste material is dispensed during use of the battery plate grid strip pasting assembly;

a support structure located at least partly underneath said orifice plate and having a trailing free edge proximate a leading edge of said opening, and supporting a battery plate grid strip at least upstream of said opening of said orifice plate, said support structure having a top surface that comes into contact with the battery plate grid strip when said support structure is supporting the battery plate grid strip; and a belt located at least partly underneath said orifice plate;

wherein said top surface presents a slope that declines toward at least a portion of a top surface of said belt underlying said opening at an included angle of approximately ten degrees (10°) to fifteen degrees (15°) and with respect to said belt, said top surface and its declining slope leading the battery plate grid strip to said belt and underneath said opening of said orifice plate, and wherein a gap is provided between a bottom surface of the battery plate grid strip and a top surface of said belt at a free edge of said support structure, battery paste material is dispensed into said gap during use of the battery plate grid strip pasting assembly.

16. The battery plate grid strip pasting assembly of claim 15, wherein said trailing free edge of said support plate is located in approximate longitudinal alignment with said leading edge of said opening.

17. The battery plate grid strip pasting assembly of claim 15, wherein said leading edge and said free edge are unaligned with each other.

18. The battery plate grid strip pasting assembly of claim 15, wherein said top surface and its declining slope define an angle relative to said top surface portion of said belt that ranges between approximately ten degrees (10°) and twelve degrees (12°).

19. The battery plate grid pasting assembly of claim 1, wherein the leading and trailing edges of the orifice are rectilinear and spaced apart about 0.7 inches.

20. The battery plate grid assembly of claim 19, wherein the leading edge of the orifice is longitudinally upstream about 0.3 inches of the axis of rotation of said paste delivery roller.

21. A battery plate grid strip pasting assembly, the assembly comprising:
   a hopper having adjacent its bottom an orifice with a leading edge and a trailing edge and through which battery paste material is dispensed out of the hopper during use of the battery plate grid strip pasting assembly, a paste delivery roller having an axis of rotation and overlying and in proximity to the orifice for delivering battery paste material out of the hopper;
   a support structure having a leading edge and a trailing free edge and underlying a battery plate grid strip and supporting the battery plate grid strip at least upstream of said orifice;
   a mechanism moving the battery grid strip longitudinally over and downstream of said support structure and under and downstream of said orifice;
   the support structure having a surface underlying and supporting the battery grid strip at least upstream of the orifice and inclined to a portion of the grid strip downstream of the orifice at an acute included angle of between approximately 5° and 15°, and the support structure is disposed longitudinally between proximate to the leading edge of the orifice and midway between the leading and trailing edges of the orifice, said support structure supports the battery plate grid strip to provide a gap below a bottom surface of the battery plate grid strip, said gap is located beneath said orifice and has a dimension below said bottom surface proximate said trailing free edge that is approximately equal to or greater than a thickness dimension of the battery plate grid strip, and battery paste material is dispensed through the battery plate grid strip and into said gap and overpastes the bottom surface of the battery plate grid strip during use of the battery plate grid strip pasting assembly.

* * * * *